US012664127B2

(12) United States Patent
Black et al.

(10) Patent No.:    US 12,664,127 B2
(45) Date of Patent:       Jun. 23, 2026

(54) DEDUPLICATE OFFICE FILES REGARDLESS OF HISTORICAL METADATA MANIPULATION BY ANOTHER SYSTEM

(71) Applicant: MICRO FOCUS LLC, Wilmington, DE (US)

(72) Inventors: Stephen Black, Belfast (GB); Dermot Hardy, Belfast (GB)

(73) Assignee: Micro Focus LLC, Wilmington, DE (US)

( * ) Notice:    Subject to any disclaimer, the term of this patent is extended or adjusted under 35 U.S.C. 154(b) by 0 days.

(21) Appl. No.: 18/412,186

(22) Filed:       Jan. 12, 2024

(65)                Prior Publication Data
US 2025/0231917 A1      Jul. 17, 2025

(51) Int. Cl.
   *G06F 16/174*          (2019.01)
   *G06F 16/16*           (2019.01)
(52) U.S. Cl.
   CPC .......... *G06F 16/1748* (2019.01); *G06F 16/16* (2019.01)
(58) Field of Classification Search
   CPC ............................ G06F 16/1748; G06F 16/16
   USPC ......................................................... 707/692
   See application file for complete search history.

(56)                References Cited

U.S. PATENT DOCUMENTS 7,814,078 B1 *  10/2010  Forman ............. G06F 16/24554
                                                      707/698
2009/0327625 A1 *  12/2009  Jaquette ................ G06F 3/0689
                                                      711/E12.078

2013/0238572 A1 *   9/2013  Prahlad ................... G06F 3/061
                                                      707/741
2016/0306560 A1 *  10/2016  Maranna ............. G06F 16/1748
2020/0005329 A1 *   1/2020  Gabriel ................. G06Q 30/00
2020/0241972 A1 *   7/2020  Dain ................... G06F 16/2457
2021/0064582 A1 *   3/2021  Wang ................... G06F 16/137
2021/0209099 A1 *   7/2021  Marsden ............. G06F 16/2465
2021/0279141 A1 *   9/2021  Vijayan ............... G06F 11/1469
2021/0397522 A1 *  12/2021  Owen ................... G06F 16/128
2022/0012134 A1 *   1/2022  Chatterjee .......... G06F 11/1469
(Continued)

OTHER PUBLICATIONS

Alexi et al, "A Data-Driven Fuzzing Tool for R", SLE '22: 15th ACM SIGPLAN International Conference on Software Language Engineering, Dec. 2022, Auckland, New Zealand, pp. 216-221 (Year: 2022).*

*Primary Examiner* — Tony Mahmoudi
*Assistant Examiner* — Kamal K Dewan
(74) *Attorney, Agent, or Firm* — Sheridan Ross P.C.

(57)                ABSTRACT

A system includes a processor and a memory. When executed by the processor, the processor is caused to receive a first file including one or more components, parse the first file into a metadata portion and one or more non-metadata portions, generate a manifest for each of the one or more non-metadata portions, generate an output data stream including component manifest and data pairs for each of the one or more non-metadata portions, normalize the output data stream, generate a first hash code corresponding to the normalized output data stream and compare the first hash code to a plurality of hash codes. If the first hash code matches any hash code of the plurality of hash codes, the processor is caused to prevent the first file from being stored in the database or automatically remove the corresponding file associated with the hash code matched with the first hash code.

20 Claims, 7 Drawing Sheets

(56)                    References Cited

U.S. PATENT DOCUMENTS

| 2022/0100415 | A1* | 3/2022 | Lv ......................... | G06F 3/0643 |
| 2023/0315681 | A1* | 10/2023 | Agrawal ............. | G06F 11/1435 |
| | | | | 707/681 |
| 2024/0143212 | A1* | 5/2024 | Tagra ...................... | G06F 3/067 |

* cited by examiner

300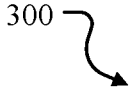

*Input data stream = MyFile.docx*          ⌐ 304

*MyFile.docx includes the following components:*          ⌐ 308

*'Filex' that contains data 'abc'*

*'Filexy' that contains data 'xyzz'*

*'Filexyz' that contains data 'qwerty'*

*Metadata*

⌐ 312

*After Parsing MyFile.docx includes the following components:*

*'Filex' that contains data 'abc'*

*'Filexy' that contains data 'xyzz'*

*'Filexyz' that contains data 'qwerty'*          ⌐ 316

*Manifest for the component "Filex" = 5,Filex3*

*Manifest for the component "Filexy" = 6,Filexy4*

*Maniftst for the component "Filexyz" = 7,Filexyz6*          ⌐ 320

*Output data stream = 5,Filex3,abc6,Filexy4,xyzz7,Filexyz6,qwerty*

*FIG. 3*

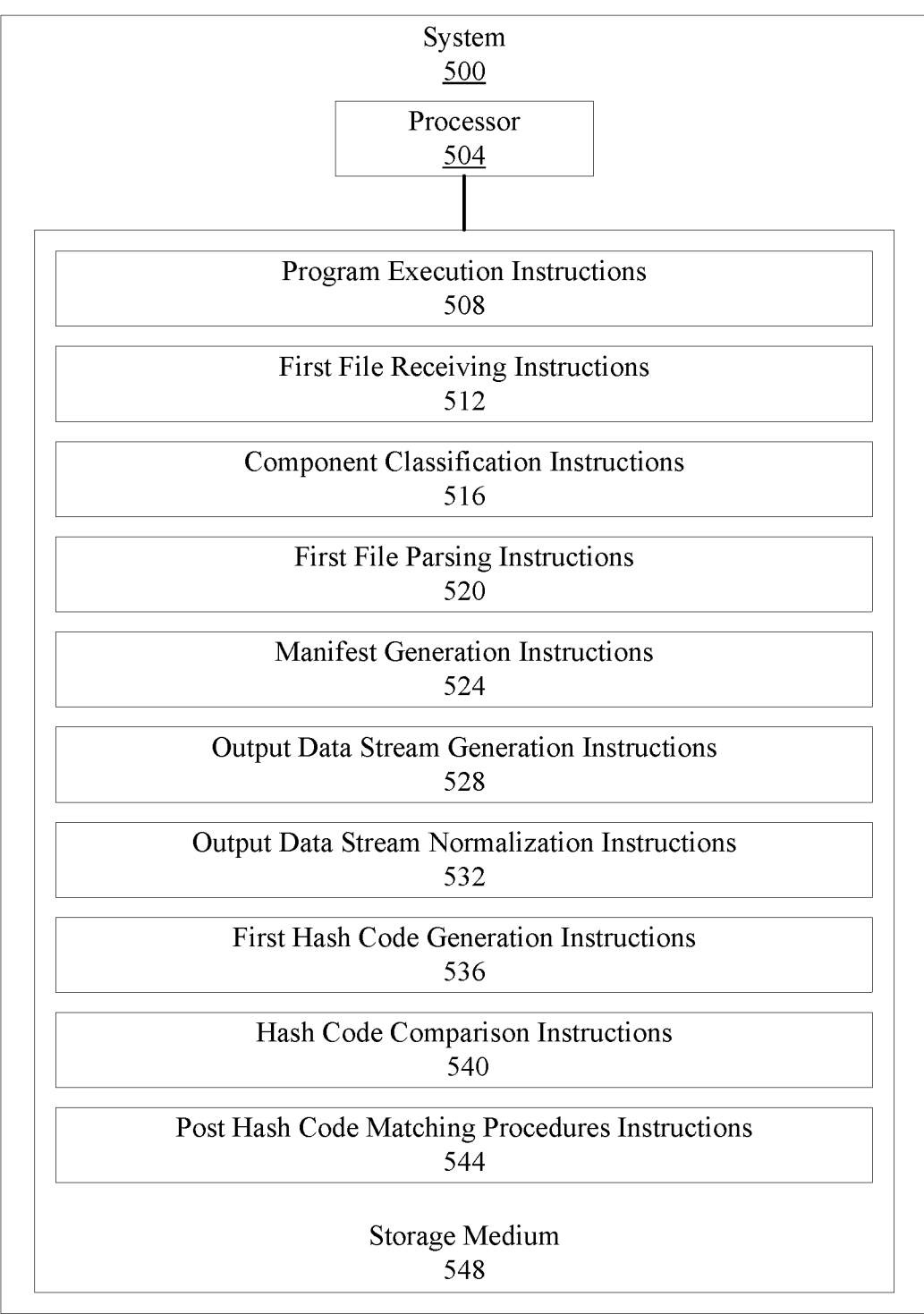

System
500

Processor
504

Program Execution Instructions
508

First File Receiving Instructions
512

Component Classification Instructions
516

First File Parsing Instructions
520

Manifest Generation Instructions
524

Output Data Stream Generation Instructions
528

Output Data Stream Normalization Instructions
532

First Hash Code Generation Instructions
536

Hash Code Comparison Instructions
540

Post Hash Code Matching Procedures Instructions
544

Storage Medium
548

*FIG. 5*

DEDUPLICATE OFFICE FILES REGARDLESS OF HISTORICAL METADATA MANIPULATION BY ANOTHER SYSTEM

FIELD

The present disclosure relates generally to systems and methods for document management, and more particularly to systems and methods for deduplication of files regardless of metadata manipulation by another system.

BACKGROUND

Some databases store an enormous number of documents or files. These documents can be stored in a single warehouse or distributed throughout many different repositories. As part of document management, these documents are periodically merged and groomed. In some instances, documents from two different repositories are merged into a larger repository. For example, multiple collections of documents are coalesced to reduce maintenance overhead.

One challenge in document management is to identify documents that are duplicative of each other. Duplications emerge when documents or portions of documents are copied and stored again. In other situations, newer or updated versions of documents are stored, but the antiquated versions are not deleted from storage.

For many reasons, the proliferation of duplicative documents is undesirable. Redundant copies require extra storage space. Furthermore, duplicative documents burden resources, especially during document searches. If a document is irrelevant or outdated, then the outdated document can pollute a list of search results. Reducing the number of duplicates and overlapping documents (or documents containing portions of other documents) can reduce the number of documents shown and, thus, enhance productivity.

Data governance is an important policy in any modern enterprise. Multiple copies of files, or files with the same content pose a problem for the quality of data in the enterprise. Until now, files that have been uploaded to a web-based document sharing or hosting platform are changed or modified in a particular way based on the web-based document sharing or hosting platform's internal policies. Subsequently, these uploaded files cannot be deduplicated against any copies that were not uploaded to the web-based document sharing or hosting platform. Therefore, there is a need for systems and methods for deduplication of files regardless of metadata manipulation by another system.

SUMMARY

Embodiments of the present disclosure provide systems, methods and non-transitory computer-readable mediums for deduplication of files regardless of metadata manipulation by another system. According to one embodiment of the present disclosure, a system includes a processor and a memory coupled with and readable by the processor and storing therein a set of instructions. When executed by the processor, the processor is caused to receive a first file represented by an input data stream including one or more components, classify each component of the one or more components into a metadata portion and one or more non-metadata portions, parse the first file into the metadata portions, generate a manifest for each of the one or more non-metadata portions and generate an output data stream including component manifest and data pairs for each of the one or more non-metadata portions. The component manifest and data pairs each include a generated manifest and corresponding data for the one or more non-metadata portions.

The processor is further caused to normalize the output data stream, generate a first hash code corresponding to the normalized output data stream and compare the first hash code to a plurality of hash codes. Each hash code of the plurality of hash codes corresponds to one or more non-metadata portions of a corresponding file of a plurality of files stored in a database. If the first hash code matches any hash code of the plurality of hash codes, the processor is further caused to perform at least one of the following: prevent the first file from being stored in the database, automatically remove the corresponding file associated with the hash code matched with the first hash code from the database; or display each of the first file and the corresponding file associated with the hash code matched with the first hash code.

Aspects of the above system include wherein the metadata portion and the one or more non-metadata portions are classified based on property promotion values included in the metadata portion.

Aspects of the above system include wherein the metadata portion and the one or more non-metadata portions are classified based on property demotion values included in the metadata portion.

Aspects of the above system include wherein the metadata portion and the one or more non-metadata portions are classified based on an identifier included in the metadata portion.

Aspects of the above system include wherein the manifest is generated based on a component name and a component length.

Aspects of the above system include wherein the manifest is generated based on a number of characters in the component name.

Aspects of the above system include wherein the output data stream is normalized based on alphabetical order.

Aspects of the above system include wherein the output data stream is normalized based on reverse alphabetical order.

Aspects of the above system include wherein the output data stream has a format including a component name length, a component name, a component length and component data.

Aspects of the above system include wherein the hash code is generated using an XXH128 hash algorithm.

According to one embodiment of the present disclosure, a method includes receiving, by a processor, a first file represented by an input data stream including one or more components, classifying, by the processor, each component of the one or more components into a metadata portion and one or more non-metadata portions, parsing, by the processor, the first file into the metadata portion and the one or more non-metadata portions, generating, by the processor, a manifest for each of the one or more non-metadata portions and generating, by the processor, an output data stream including component manifest and data pairs for each of the one or more non-metadata portions. The component manifest and data pairs each include a generated manifest and corresponding data for the one or more non-metadata portions.

The method further includes normalizing, by the processor, the output data stream, generating, by the processor, a first hash code corresponding to the normalized output data stream, comparing, by the processor, the first hash code to a plurality of hash codes, each hash code of the plurality of hash codes corresponding to one or more non-metadata portions of a corresponding file of a plurality of files stored in a database and if the first hash code matches any hash code of the plurality of hash codes, perform at least one of the following: preventing, by the processor, the first file from being stored in the database, automatically removing, by the processor, the corresponding file associated with the hash code matched with the first hash code from the database or displaying, by the processor, each of the first file and the corresponding file associated with the hash code matched with the first hash code.

Aspects of the above method include wherein the metadata portion and the one or more non-metadata portions are classified based on property promotion values included in the metadata portion.

Aspects of the above method include wherein the metadata portion and the one or more non-metadata portions are classified based on property demotion values included in the metadata portion.

Aspects of the above method include wherein the metadata portion and the one or more non-metadata portions are classified based on an identifier included in the metadata portion.

Aspects of the above method include wherein the manifest is generated based on a component name and a component length.

Aspects of the above method include wherein the manifest is generated based on a number of characters in the component name.

Aspects of the above method include wherein the output data stream is normalized based on alphabetical order.

Aspects of the above method include wherein the output data stream is normalized based on reverse alphabetical order.

Aspects of the above method include wherein the output data stream has a format including a component name length, a component name, a component length and component data.

According to one embodiment of the present disclosure, a non-transitory, computer-readable medium includes a set of instructions stored therein which when executed by a processor, causes the processor to receive a first file represented by an input data stream including one or more components, classify each component of the one or more components into a metadata portion and one or more non-metadata portions, parse the first file into the metadata portion and the one or more non-metadata portions, generate a manifest for each of the one or more non-metadata portions and generate an output data stream including component manifest and data pairs for each of the one or more non-metadata portions. The component manifest and data pairs each include a generated manifest and corresponding data for the one or more non-metadata portions.

The processor is further caused to normalize the output data stream, generate a first hash code corresponding to the normalized output data stream and compare the first hash code to a plurality of hash codes. Each hash code of the plurality of hash codes corresponds to one or more non-metadata portions of a corresponding file of a plurality of files stored in a database. If the first hash code matches any hash code of the plurality of hash codes, the processor is further caused to perform at least one of the following: prevent the first file from being stored in the database, automatically remove the corresponding file associated with the hash code matched with the first hash code from the database; or display each of the first file and the corresponding file associated with the hash code matched with the first hash code.

These and other needs are addressed by the various embodiments and configurations of the present disclosure. The present disclosure can provide a number of advantages depending on the particular configuration. These and other advantages will be apparent from the disclosure contained herein.

Embodiments of the present disclosure provide a number of advantages over conventional deduplication systems and methods. In a non-limiting example, duplicate files across one or more datasets are detected. A master file for each group of duplicate files is determined and the redundant duplicate files are removed. Here, a binary hash of each file is generated and then the generated hashes are compared to each other during the deduplication process.

The binary hash feature, however, may be compromised when files are uploaded to web-based document sharing or hosting platforms. When these uploaded files are subsequently downloaded and compared to respective copies of the files that were not uploaded to the web-based document sharing or hosting platforms, the binary hashes do not match. This is because the web-based document sharing or hosting platforms change or modify the uploaded files by adding additional metadata to the uploaded files.

Some systems may change or modify the uploaded files using Document Property Promotion and Demotion processes. Property promotion refers to a process of extracting values from properties of a document and then writing those values to corresponding columns on the list or document library where the document is stored. Property demotion is the same process but performed in reverse. Values are read from the list columns and written to document properties.

Other systems may also change or modify the uploaded files by way of the metadata added or removed from the uploaded file. This change or modification to the uploaded file also affects the binary hash comparison. As discussed above, for deduplication, comparing binary hashes was the prior solution. Comparing binary hashes during a deduplication process, however, is inoperable when files have been changed or modified by another system, such as a web-based document sharing or hosting platform, for example. Accordingly, embodiments of the present disclosure, circumvent such file changes and modifications and enables deduplication systems to match files based on a hash value regardless of whether metadata for the uploaded files have been manipulated by another system such as a web-based document sharing or hosting platform.

By efficiently deduplicating documents in a database, the overall size of the database is dramatically reduced in comparison to conventional deduplication systems and methods. This results in a much more efficient database structure that can support duplicative data being removed while relevant data is retained than was previously possible using the same hardware.

Because embodiments of the present disclosure can support duplicative data being removed while relevant data is retained using the same hardware, this allows embodiments of the present disclosure to support a higher number of transactions more efficiently and at lower cost. The described embodiments of the present disclosure make the existing hardware more efficient while reducing the overall costs to data deduplication on a large scale, which was previously impossible.

In addition, systems and methods for deduplication of files regardless of metadata manipulation by another system described herein are designed to support document addition and removal in real-time. Being able to support document addition and removal in real-time is clearly something that cannot be done practically using a mental process. Instead, document addition and removal in real-time described herein will only work practically in a computerized environment.

Being able to support a higher number of document searches based on deduplication more efficiently and at a lower cost cannot be performed manually and in real-time. For example, being able to support a higher number of document searches based on deduplication more efficiently and at a lower cost involves managing terra bytes of information from a very large number of devices to identify issues from a very large number of users in real-time (e.g., thousands of users). Being able to support a higher number of document searches based on deduplication more efficiently and at a lower cost would simply take too long if performed using a pen and paper.

Furthermore, systems and methods for deduplication of files regardless of metadata manipulation by another system described herein allows for the deduplication of files even if the files seem to be different at first glance (e.g., the file size). In an enterprise setting, where subsets of files have been shifted from one storage area to another storage area, embodiments of the present disclosure are applicable. Moreover, systems and methods for deduplication of files regardless of metadata manipulation by another system described herein allows for the deduplication of files even if the files seem to be different at first glance (e.g., components of the file are not stored in the same order). By removing the same files that have different sizes and/or that have components that are not arranged in the same order, reduces the overall size of the database in which the files are stored.

Some implementations of the present disclosure described herein may realize, in certain instances, one or more of the following advantages. A system implementing deduplication of files regardless of metadata manipulation by another system may improve the rate at which documents are processed compared to systems that do not implement deduplication of files regardless of metadata manipulation by another system, thus improving process efficiency. Furthermore, a system implementing deduplication of files regardless of metadata manipulation by another system may incur a reduced number of errors, e.g., human errors, and an increase in document deduplication accuracy when compared to other systems that do not implement deduplication of files regardless of metadata manipulation by another system.

The details of one or more embodiments of the subject matter described in this specification are set forth in the accompanying drawings and the description below. Other potential features, aspects, and advantages of the subject matter will become apparent from the description, the drawings, and the claims.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. For example, the computer readable medium(s) may be non-transitory or non-volatile medium, such as a magnetic disk or solid-state non-volatile memory or volatile medium such as RAM.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

As used herein, the term "file" has broad application and includes documents (example, files produced or edited from a software application), collection of related data, and/or sequence of related information (such as a sequence of electronic bits) stored in a computer. In one exemplary embodiment of the present disclosure, files are created with software applications and include a particular file format (i.e., way information is encoded for storage) and a file name. Embodiments in accordance with the present disclosure include numerous different types of files such as, but not limited to, text files (a file that holds text or graphics, such as American Standard Code for Information Interchange (ASCII) files; Hyper Text Markup Language (HTML) files; Portable Document Format (PDF) files; and Postscript files), program files, and/or directory files.

As used herein, a document is defined as an electronic document such as a media resource that can be electronically stored and that contains images or sound, either separately (e.g., photos, slideshows, silent films or audio recordings), combined (e.g., videos or animation), or in conjunction with other content (e.g., presentations with text, multimedia presentations).

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 3 illustrates an example used for deduplication of files regardless of metadata manipulation by another system according to an embodiment of the present disclosure.

FIG. 5 is a block diagram of a system for deduplication of files regardless of metadata manipulation by another system according to embodiments of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Embodiments of the present disclosure are directed to systems and methods for deduplication of files regardless of metadata manipulation by another system. According to embodiments of the present disclosure, a system includes a processor and a memory coupled with and readable by the processor and storing therein a set of instructions. When executed by the processor, the processor is caused to receive a first file represented by an input data stream including one or more components, classify each component of the one or more components into a metadata portion and one or more non-metadata portions, parse the first file into the metadata portion and the one or more non-metadata portions, generate a manifest for each of the one or more non-metadata portions and generate an output data stream including component manifest and data pairs for each of the one or more non-metadata portions. The component manifest and data pairs each include a generated manifest and corresponding data for the one or more non-metadata portions.

The processor is further caused to normalize the output data stream, generate a first hash code corresponding to the normalized output data stream and compare the first hash code to a plurality of hash codes. Each hash code of the plurality of hash codes corresponds to one or more non-metadata portions of a corresponding file of a plurality of files stored in a database. If the first hash code matches any hash code of the plurality of hash codes, the processor is further caused to perform at least one of the following: prevent the first file from being stored in the database, automatically remove the corresponding file associated with the hash code matched with the first hash code from the database; or display each of the first file and the corresponding file associated with the hash code matched with the first hash code.

Figure 1:
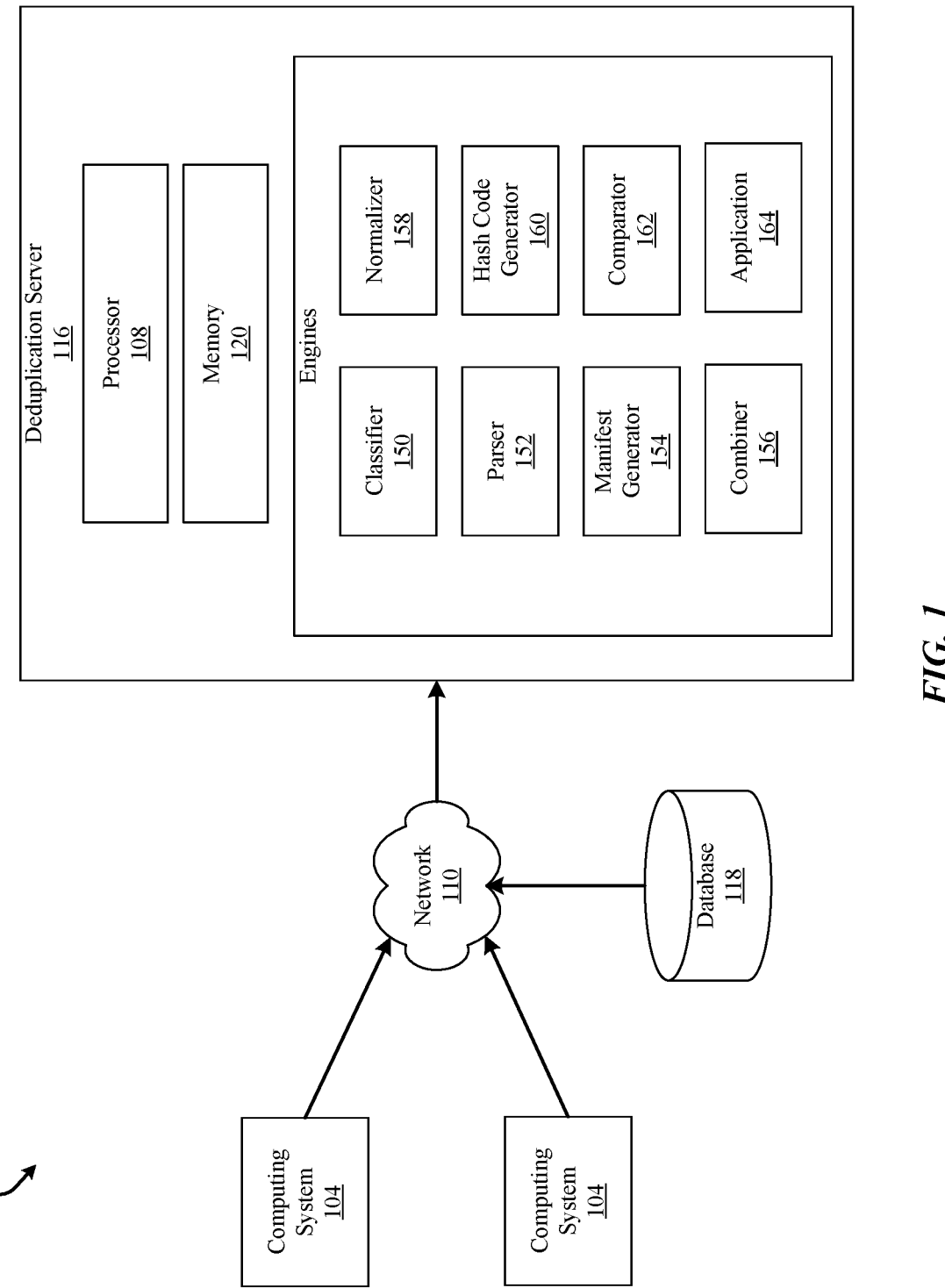
FIG. 1 is a block diagram illustrating elements of an example computing environment including an example deduplication server for deduplication of files regardless of metadata manipulation by another system in which embodiments of the present disclosure may be implemented.

FIG. 1 is a block diagram illustrating elements of an example computing environment 100 including an example deduplication server 116 for deduplication of files regardless of metadata manipulation by another system in which embodiments of the present disclosure may be implemented. The computing environment 100 may include similar elements illustrated in FIG. 6, including, but not limited to computer/servers (labeled as computing systems 104), a network (labeled as 110) and a database (labeled as 118). Since these elements are discussed in FIG. 6, a full description of these elements will be omitted.

The deduplication server 116 is capable of automatically deduplicating files regardless of metadata manipulation by another system. The deduplication server 116 is connected via a communication medium, for example the network 110, a proprietary network, or other communication connection, to a number of remote computing systems 104 and one or more databases 118. Those skilled in the art will appreciate that the actual implementation of the database 118 may take a variety of forms, including storage in a computer-readable medium, and the terms "database", "repository" and "warehouse" are used in the generic sense to refer to any data structure that allows data to be stored and accessed, such as tables, linked lists, arrays, etc.

Figure 7:
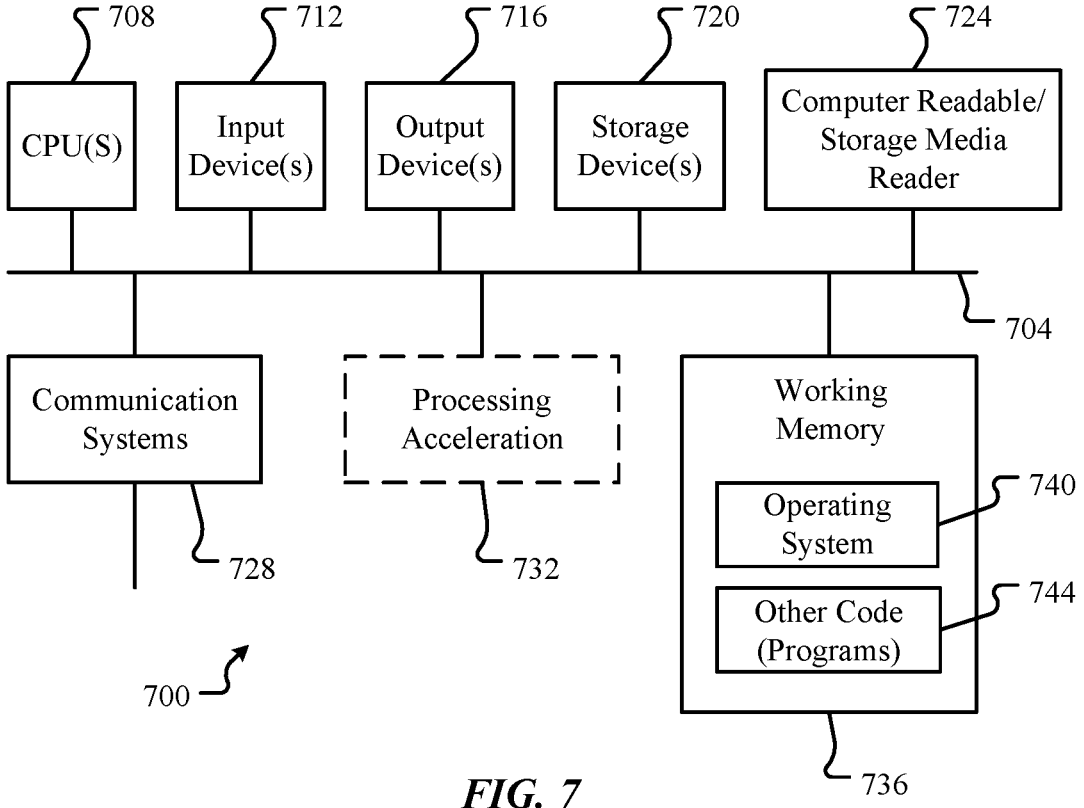
FIG. 7 is a block diagram illustrating elements of an example computing system in which embodiments of the present disclosure may be implemented.

The deduplication server 116 may include a processor 108 (similar to the CPU(s) 708 described in FIG. 7) and a memory 120 (similar to the storage device(s) 720 and/or the working memory 736 also illustrated in FIG. 7). Deduplication server 116 further includes various engines, such as but not limited to, a classifier engine 150, a parser engine 152, a manifest generator engine 154, a combiner engine 156, a normalizer engine 158, a hash code generator engine 160, a comparator engine 162 and an application engine 164.

The application engine 164 includes a variety of applications, including for example, database client and/or server applications, web browser applications, data access and management applications, etc. According to one embodiment of the present disclosure, the application engine 164 may be a series of processor-executable instructions stored in a processor-readable storage medium on the computing systems 104 and being executed by one or more processors within the deduplication server 116 and/or other devices. The series of processor-executable instructions included in the application engine 164 may enable the application engine 164 to receive and process inputs and provide outputs based on the processing of the inputs. The inputs may be received manually from users or from other applications, external machinery, databases and the like.

Various operations that occur during the normal execution of the application engine 164 include, but are not limited to, accessing the application engine 164 by the computing systems 104, generating a graphical user interface (GUI) screen, making any changes to the database 118, etc.

The classification engine 150 classifies each component of an input file represented by an input stream, into a metadata portion and one or more non-metadata portions. The classification of the metadata portion and the one or more non-metadata portions can be determined in a number of different ways. As a first example, the metadata portion and the one or more non-metadata portions can be classified based on identifying properties and personal information data from file content (the relevant or original content of the file). As another example the metadata portion and the one or more non-metadata portions can be classified based on identifying descriptive, structural, administrative, statistical, legal and/or reference metadata from the relevant content of the file. As another example, the metadata portion and the one or more non-metadata portions can be classified based on identifying data provided in a blacklist identifying metadata. According to an alternative embodiment of the present disclosure, the metadata portion and the one or more non-metadata portions can be classified based on identifying data provided in a whitelist identifying non-metadata. According to another embodiment of the present disclosure, the metadata portion and the one or more non-metadata portions can be classified based on identifying property promotion values included in the metadata portion. According to another embodiment of the present disclosure, the metadata portion and the one or more non-metadata portions can be classified based on identifying property demotion values included in the metadata portion.

The parser engine 152 parses the file into the metadata portion and the one or more non-metadata portions. According to embodiments of the present disclosure, there may be more than one metadata portions provided in the file. In this case, the parser engine 152 collects all of the metadata portions and removes the metadata portions from the file.

The manifest generator engine 154 generates a manifest for each of the non-metadata portions. According to one embodiment of the present disclosure, the formula for generating a manifest for each of the non-metadata portions includes calculating a component name length as a first entry for the manifest. After calculating the component name length, the component name is added as a second entry for the manifest. After adding the component name as a second entry for the manifest, the component data length is calculated as a third entry for the manifest.

The combiner engine 156 generates an output data stream including component manifest and data pairs for the one or more non-metadata portions. According to an embodiment of the present disclosure, the component manifest data pairs each include the generated manifest and the corresponding data for the one or more metadata portions.

The normalizer engine 158 normalizes the output data stream. According to an embodiment of the present disclosure, the output data stream is normalized based on alphabetical order. According to an alternative embodiment of the present disclosure, the output data stream is normalized based on reverse alphabetical order. According to further embodiments of the present disclosure, other types of alphabetical ordering could be employed including ascending the non-metadata by invariant culture. Alternative permutations could instead utilize InvariantCultureIgnoreCase, CurrentCulture, CurrentCultureIgnoreCase, Ordinal or OrdinalIgnoreCase. Furthermore, each permutation could alternatively be ordered in a descending manner.

The hash code generator engine 160 generates a hash code corresponding to the normalized output data stream. A hash code, for example, is a number generated from a string of text or data. The hash is generally smaller than the text itself and is generated by a formula. A hash function H, for example, is a transformation that takes an input "m" and returns a fixed-size string, called a hash value "h" (such that $h=H(m)$). The hash code concisely represents the normalized output data stream. The hash code is shorter than the typical size of the normalized output data stream and fixed in length or size. As such, hashes are computationally quicker to compare than normalized output data streams. Further, hashes provide efficient data structures for lookup and comparison (example, reverse indices and lookup tables).

A variety of hash functions (now known or developed in the future) can be utilized with embodiments in accordance with the present disclosure. Examples of such hash functions include, but are not limited to, MD5 (message-digest algorithm), SHA-1, SHA-256, SHA-384 and SHA-512 (secure hash algorithms), XXH64 and XXH128 hash algorithms, digital signatures, and other known or hereafter developed hashing algorithms.

The comparator engine 162 compares the hash code to a plurality of previously stored hash codes stored in database 118 or other storage device(s) containing files used by the comparator engine 162 for comparative purposes. According to an embodiment of the present disclosure, each hash code of the plurality of previously stored hash codes corresponds to one or more non-metadata portions of a corresponding file of a plurality of files stored in the database 118 or other storage device(s) containing files used by the comparator engine 162 for comparative purposes. As discussed in greater detail below, if there is at least one match by the comparator engine 162, the processor 108, the input device (s) 712 and/or the output device(s) 716 illustrated in FIG. 7, perform one or more post hash code matching procedures. According to one embodiment of the present disclosure, the one or more past hash code matching procedures at least includes preventing the file from being stored in the database 118, automatically removing the corresponding file associated with the hash code matched with the hash code from the database 118 and displaying each of the file and the corresponding file associated with the hash code matched with the hash code.

It should be noted that other methods may be used to compare normalized output data streams for matching and deduplication of files. As non-limiting examples, checksum functions and/or byte-by-byte comparisons may be used to compare normalized output data streams.

Figure 2:
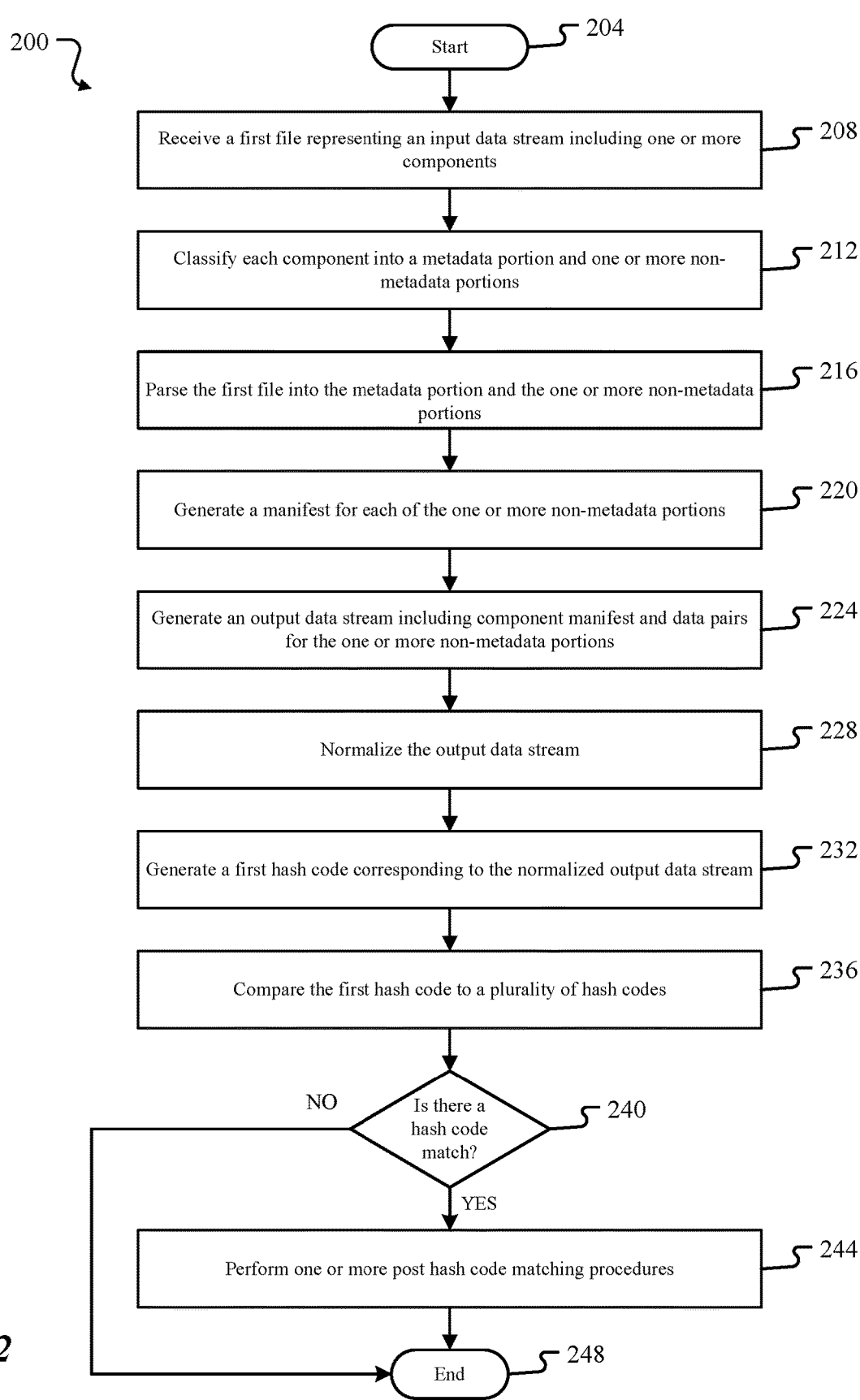
FIG. 2 is a flowchart illustrating an example method for deduplication of files regardless of metadata manipulation by another system according to an embodiment of the present disclosure.

FIG. 2 is a flowchart illustrating an example method 200 for deduplication of files regardless of metadata manipulation by another system according to embodiments of the present disclosure. While a general order of the steps of method 200 is shown in FIG. 2, method 200 can include more or fewer steps or can arrange the order of the step differently than those shown in FIG. 2. Further, two or more steps may be combined in one step. Generally, method 200 starts with a START operation at step 204 and ends with an END operation at step 248. Method 200 can be executed as a set of computer-executable instructions executed by a computer system (e.g., processor 108, the deduplication server 116, etc.) and encoded or stored on a computer readable medium (e.g., memory 120). Hereinafter, method 200 shall be explained with reference to the systems, components, modules, applications, software, data structures, user interfaces, etc. described in conjunction with FIGS. 1 and 3-7.

Method 300 begins with the START operation at step 304 and proceeds to step 308, where the processor 108 receives a first file representing an input data stream including one or more components. Referring to FIG. 3 which illustrates an example 300 used for deduplication of files regardless of metadata manipulation by another system according to an embodiment of the present disclosure, an example input data stream 304 includes a first file named "MyFile.docx". The first file "MyFile.docx" includes the following components: component "Filex" that contains data "abc"; the component "Filexy" that contains data "xyzz"; the component "Filexyz" that contains data "qwerty" and the component "Metadata". The metadata may include, for example, properties and personal information data, descriptive, structural, administrative, statistical, legal and/or reference metadata, data provided in a blacklist identifying metadata, property promotion values, property demotion values, etc.

After receiving the first file representing the input data stream including one or more components at step 208, method 200 proceeds to step 212, where the processor 108 and/or the classifier engine 150 classifies each component of the one or more components of the input data stream into a metadata portion and one or more non-metadata portions. For example, as illustrated at 308 in FIG. 3, the file "MyFile-.docx" is classified into a metadata portion "Metadata" and one or more non-metadata portions: "Filex"; "Filexy"; and "Filexyz". According to an alternative embodiment of the present disclosure, one or more metadata portions may be provided within the file. In this case, all of the metadata portions are classified and summed as one metadata portion.

After classifying each component of the one or more components of the input data stream into a metadata portion and one or more non-metadata portions at step 212, method 200 proceeds to step 216, where the processor 108 and/or the parser engine 152 parses the first file into the metadata portion and the one or more non-metadata portions. Again, referring to FIG. 3, 312 illustrates the one or more non-metadata portions parsed from the "Metadata" such that the first file includes "Filex", "Filexy" and "Filexyz".

After parsing the first file into the metadata portion and the one or more non-metadata portions and removing the metadata portion from the first file at step 216, method 200 proceeds to step 220, where the processor 108 and/or the manifest generator engine 154 generates a manifest for each of the one or more non-metadata portions. According to one embodiment of the present disclosure, the formula for generating a manifest for a component including a non-metadata portion of an input data stream includes calculating a component name length as a first entry for the manifest. After calculating the component name length, the component name is added as a second entry for the manifest. After adding the component name as the second entry for the manifest, the component data length is calculated as a third entry for the manifest. As illustrated in FIG. 3, 316 illustrates the manifest for each of the one or more non-metadata portions, "Filex", "Filexy" and "Filexyz". For the non-metadata portion "Filex", the manifest is generated by calculating the length for the component name "Filex" as the first entry for the manifest. Since the component name "Filex" has five (5) characters, the component name length is five (5). After calculating the component name length for the component "Filex", the component name "Filex" is added as the second entry for the manifest. After adding the component name "Filex" as the second entry for the manifest, the component data length is calculated as the third entry for the manifest. Since the component "Filex" contains the data "abc", the component data length for "abc" is three (3). Therefore, the manifest for the component "Filex" is "5,Filex3".

For the non-metadata portion "Filexy", the manifest is generated by calculating the length for the component name "Filexy" as a first entry for the manifest. Since the component name "Filexy" has six (6) characters, the component name length is six (6). After calculating the component name length for the component "Filexy", the component name "Filexy" is added as the second entry for the manifest. After adding the component name "Filexy" as the second entry for the manifest, the component data length is calculated as the third entry for the manifest. Since the component "Filexy" contains the data "xyzz", the component data length for "xyzz" is four (4). Therefore, the manifest for the component "Filexy" is "6, Filexy4".

For the non-metadata portion "Filexyz", the manifest is generated by calculating the length for the component name "Filexyz" as the first entry for the manifest. Since the component name "Filexyz" has seven (7) characters, the component name length is seven (7). After calculating the component name length for the component "Filexyz", the component name "Filexyz" is added as the second entry for the manifest. After adding the component name "Filexyz" as the second entry for the manifest, the component data length is calculated as the third entry for the manifest. Since the component "Filexyz" contains the data "qwerty", the component data length is six (6). Therefore, the manifest for the component "Filexyz" is "7,Filexyz6".

After generating the manifest for each of the one or more non-metadata portions at step 220, method 200 proceeds to step 224, where the processor 108 and/or combiner engine 156 generates an output data stream including component manifest and data pairs for the one or more non-metadata portions. According to an embodiment of the present disclosure, the component manifest data pairs each includes a generated manifest and the corresponding data for the one or more metadata portions. Referring again to FIG. 3, 320 illustrates a non-limiting embodiment of the output data stream. The output data stream includes the generated manifests for each of the one or more non-metadata portions "Filex", "Filexy" and "Filexyz". As discussed above, the generated manifest for "Filex" is "5,Filex3", the generated manifest for "Filexy" is "6,Filexy4" and the generated manifest for "Filexyz" is "7,Filexyz6". The generated manifest is then paired with the component data "abc", "xyzz" and "qwertz" for the one or more non-metadata portions "Filex", "Filexy" and "Filexyz, respectively, producing the output data stream of "5,Filex3abc6,Filexy4xyzz7, Filexyz6qwerty". One of ordinary skill in the art will recognize that other methods may be executed for generating output data stream embodiments as long as the output data stream includes the component manifest for the one or more non-metadata portions and the data pairs for the one or more non-metadata portions, such as (but not limited to), producing the component manifests for the non-metadata portions followed by producing the corresponding data for the non-metadata portions.

After generating the output stream including component manifest and data pairs for the one or more non-metadata portions at step 224, method 200 proceeds to step 228, where the processor 108 and/or normalizer engine 158 normalizes the output data stream. According to an embodiment of the present disclosure, the output data stream is normalized based on alphabetical order. According to an alternative embodiment of the present disclosure, the output data stream is normalized based on reverse alphabetical order.

After normalizing the output data stream at step 228, method 200 proceeds to step 232, where the processor 108 and/or the hash code generator engine 160 generates a first hash code corresponding to the normalized output data stream.

After generating a first hash code corresponding to the normalized output data stream at step 232, method 200 proceeds to step 236, where the processor 108 and/or the comparator engine 162 compares the first hash code to a plurality of previously stored hash codes. According to an embodiment of the present disclosure, each hash code of the plurality of previously stored hash codes corresponds to one or more non-metadata portions of a corresponding file of a plurality of files stored in a database.

After comparing the first hash code to a plurality of previously stored hash codes at step 236, method 200 proceeds to decision step 240, where the processor 108 and/or the comparator engine 162 determines if there is a hash code match between the first hash code and anyone of the previously stored hash codes. If there is no match, (NO) at decision step 240, method 200 ends with the END operation at step 248. If there is at least one match, (YES) at decision step 240, method 200 proceeds to step 244, where the processor 108, the input device(s) 712 and/or the output device(s) 716, performs one or more post hash code matching procedures. According to one embodiment of the present disclosure, the one or more post hash code matching procedures at least includes preventing the first file from being stored in the database, automatically removing the corresponding file associated with the hash code matched with the first hash code from the database and displaying each of the first file and the corresponding file associated with the hash code matched with the first hash code.

After performing one or more post hash code matching procedures at step 244, method 200 ends with the END operation at step 248.

Figure 4:
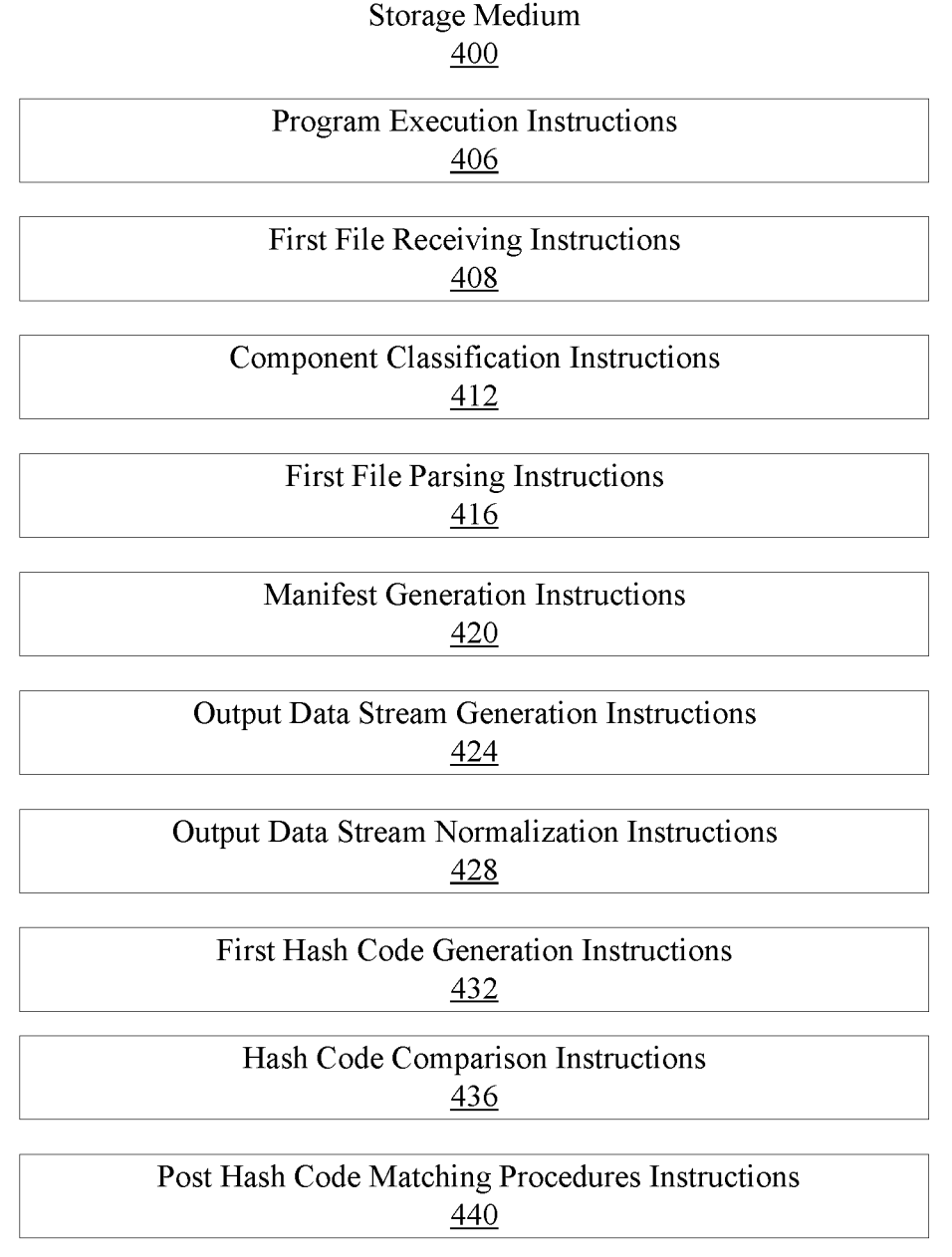
FIG. 4 is a block diagram of a storage medium storing machine-readable instructions for deduplication of files regardless of metadata manipulation by another system according to embodiments of the present disclosure.

FIG. 4 is a block diagram of a non-transitory machine-readable or computer-readable storage medium 400 storing machine-readable instructions that upon execution cause a system to perform various tasks. The machine-readable instructions include program execution instructions 406 to execute an application (e.g., 164 in FIG. 1) that generates a GUI screen.

The machine-readable instructions include first file receiving instructions 408 to receive a first file representing an input data stream including one or more components (e.g., a mouse event, a keyboard event, a touch event, etc.) to the application during execution (where the user input of the first file can be detected).

The machine-readable instructions also include component classification instructions 412 to classify each component of the one or more components into a metadata portion and one or more non-metadata portions.

The machine-readable instructions include first file parsing instructions 416 to parse the first file into the metadata portion and the one or more non-metadata portions. The machine-readable instructions include manifest generation instructions 420 to generate a manifest for each of the one or more non-metadata portions. The machine-readable instructions include output data stream generation instructions 424 to generate an output data stream including component manifest and data pairs for the one or more non-metadata portions. The component manifest and data pairs include a generated manifest and corresponding data for the one or more non-metadata portions. The machine-readable instructions include output data stream normalization instructions 428 to normalize the output data stream. The machine-readable instructions include first hash code generation instructions 432 to generate a first hash code corresponding to the normalized output data stream. The machine-readable instructions further include hash code comparison instructions 436 to compare the first hash code to a plurality of previously stored hash codes. According to an embodiment of the present disclosure, each hash code of the plurality of previously stored hash codes corresponds to one or more non-metadata portions of a corresponding file of a plurality of files stored in a database.

The machine-readable instructions further include post hash code matching procedures instructions 440 to perform one or more post hash code matching procedures if there is a hash code match between the first hash code and anyone of the previously stored hash codes. According to one embodiment of the present disclosure, the one or more post hash code matching procedures at least includes preventing the first file from being stored in the database, automatically removing the corresponding file associated with the hash code matched with the first hash code from the database and displaying each of the first file and the corresponding file associated with the hash code matched with the first hash code.

FIG. 5 is a block diagram of a system 500 for deduplication of files regardless of metadata manipulation by another system according to embodiments of the present disclosure. System 500 includes a hardware processor 504 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 500 further includes a storage medium 548 storing machine-readable instructions executable on the hardware processor 504 to perform various tasks. Machine-readable instructions executable on a hardware processor can refer to the instructions executable on a single hardware processor or the instructions executable on multiple hardware processors.

The machine-readable instructions stored in the storage medium 548 include program execution instructions 508 to execute an application that generates a GUI screen. The machine-readable instructions also include first file receiving instructions 512 to receive a first file representing an input data stream including one or more components. The machine-readable instructions also include component classification instructions 516 to classify each component of the one or more components into a metadata portion and one or more non-metadata portions.

The machine-readable instructions include first file parsing instructions 520 to parse the first file into the metadata portion and the one or more non-metadata portions. The machine-readable instructions include manifest generation instructions 524 to generate a manifest for each of the one or more non-metadata portions. The machine-readable instructions include output data stream generation instructions 528 to generate an output data stream including component manifest and data pairs for the one or more non-metadata portions. The component manifest and data pairs include a generated manifest and corresponding data for the one or more non-metadata portions. The machine-readable instructions include output data stream normalization instructions 532 to normalize the output data stream. The machine-readable instructions include first hash code generation instructions 536 to generate a first hash code corresponding to the normalized output data stream. The machine-readable instructions include hash code comparison instructions 540 to compare the first hash code to a plurality of previously stored hash codes. According to an embodiment of the present disclosure, each hash code of the plurality of previously stored hash codes corresponds to one or more non-metadata portions of a corresponding file of a plurality of files stored in a database.

The machine-readable instructions further include post hash code matching procedures instructions 544 to perform one or more post hash code matching procedures if there is a hash code match between the first hash code and anyone of the previously stored hash codes. According to one embodiment of the present disclosure, the one or more post hash code matching procedures at least includes preventing the first file from being stored in the database, automatically removing the corresponding file associated with the hash code matched with the first hash code from the database and displaying each of the first file and the corresponding file associated with the hash code matched with the first hash code.

Figure 6:
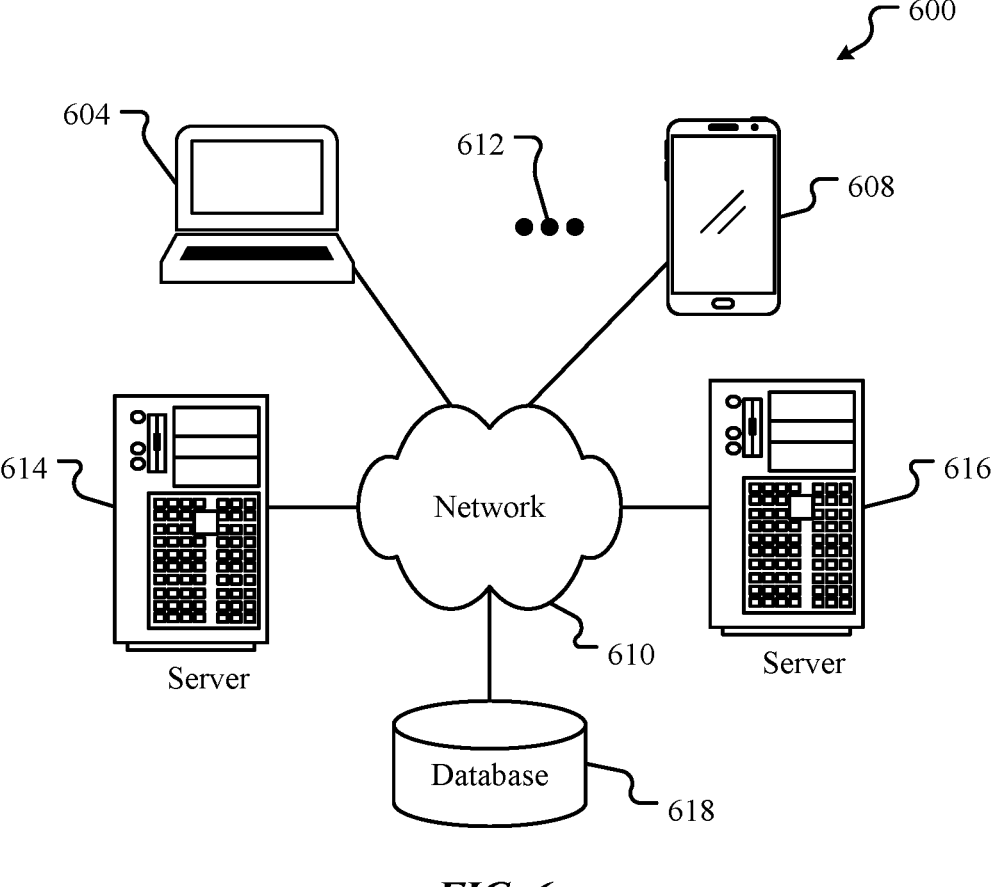
FIG. 6 is a block diagram illustrating elements of an example computing environment in which embodiments of the present disclosure may be implemented.

FIG. 6 is a block diagram illustrating elements of an example computing environment 600 in which embodiments of the present disclosure may be implemented. More specifically, this example illustrates a computing environment 600 that may function as the servers, user computers, or other systems provided and described herein. The environment 600 includes one or more user computers, or computing devices, such as a computer 604, a communication device 608, and/or more devices 612. The devices 604, 608, 612 may include general purpose personal computers (including, merely by way of example, personal computers, and/or laptop computers running various versions of Microsoft® Corp.'s Windows® and/or Apple Corp.'s Macintosh® operating systems) and/or workstation computers running any of a variety of commercially-available UNIX® or UNIX-like operating systems. Web-based document sharing or hosting platforms may include, for example, Microsoft®'s SharePoint®, Teams® and OneDrive® or Dropbox®'s Dropbox®. These devices 604, 608, 612 may also have any of a variety of applications, including for example, database client and/or server applications, and web browser applications. Alternatively, the devices 604, 608, 612 may be any other electronic device, such as a thin-client computer, Internet-enabled mobile telephone, and/or personal digital assistant, capable of communicating via a network 610 and/or playing audio, displaying images, etc. Although the example computer environment 600 is shown with two devices, any number of user computers or computing devices may be supported.

Environment 600 further includes a network 610. The network 610 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 610 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The environment 600 may also include one or more servers 614, 616. For example, the servers 614, 616 may comprise build servers, which may be used to test webpage layouts on various screen sizes via the device 604, 608, 612. The servers 614, 616 can be running an operating system including any of those discussed above, as well as any commercially available server operating systems. The servers 614, 616 may also include one or more files and/or application servers, which can, in addition to an operating system, include one or more applications accessible by a client running on one or more of the devices 604, 608, 612. The server(s) 614 and/or 616 may be one or more general purpose computers capable of executing programs or scripts in response to the computers 604, 608, 612. As one example, the servers 614 and 616, may execute one or more automated tests. The automated tests may be implemented as one or more scripts or programs written in any programming language, such as Java™, C, C#®, or C++, and/or any scripting language, such as Perl, Python, or Tool Command Language (TCL), as well as combinations of any programming/scripting languages. The server(s) 614 and 616 may also include database servers, including without limitation those commercially available from Oracle®, Microsoft®, Sybase®, IBM® and the like, which can process requests from database clients running on the device 604, 608, 612.

The tests created and/or initiated by the device 604, 608, 612 (including tests created by other devices not illustrated) are shared to the server 614 and/or 616, which then may test and/or deploy the websites/webpages. The server 614 and/or 616 may transfer the generated webpage layout and/or data related to the same to the device 604, 608, 612. Although for ease of description, FIG. 6 illustrates two servers 614 and 616, those skilled in the art will recognize that the functions described with respect to servers 614, 616 may be performed by a single server and/or a plurality of specialized servers, depending on implementation-specific needs and parameters. The computer systems 604, 608, 612, and servers 614, 616 may function as the system, devices, or components described herein.

The environment 600 may also include a database 618. The database 618 may reside in a variety of locations. By way of example, database 618 may reside on a storage medium local to (and/or resident in) one or more of the computers/servers 604, 608, 612, 614, 616. Alternatively, the database 618 may be remote from any or all of the computers/servers 604, 608, 612, 614, 616, and in communication (e.g., via the network 610) with one or more of these. The database 618 may reside in a Storage-Area Network (SAN) familiar to those skilled in the art. Similarly, any necessary files for performing the functions attributed to the computers/servers 604, 608, 612, 614, 616 may be stored locally on the respective computer/server and/or remotely, as appropriate. The database 618 may be used to store webpage layout data (e.g., respective locations of a plurality of elements), alerts, etc.

FIG. 7 is a block diagram illustrating elements of an example computing system 700 in which embodiments of the present disclosure may be implemented. More specifically, this example illustrates one embodiment of a computer system 700 upon which the servers, computing devices, or other systems or components described above may be deployed or executed. The computer system 700 is shown comprising hardware elements that may be electrically coupled via a bus 704. The hardware elements may include one or more Central Processing Units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a Random-Access Memory (RAM) and/or a Read-Only Memory (ROM), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a Digital Signal Processor (DSP), a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computers such as network input/output devices may be employed.

Examples of the processors 708 as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific details set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for deduplicating files, comprising:

a processor; and a memory coupled with and readable by the processor and storing therein a set of instructions which, when executed by the processor, causes the processor to:

receive a first file represented by an input data stream including one or more components;

classify each component of the one or more components into a metadata portion and one or more non-metadata portions;

parse the first file into the metadata portion and the one or more non-metadata portions;

generate, for each of the one or more non-metadata
portions, a manifest comprising:
a first entry representing a calculated component
name length;
a second entry representing a component name; and
a third entry representing a calculated component
data length;
generate an output data stream including component
manifest and data pairs for each of the one or more
non-metadata portions;
wherein each component manifest and data pairs each
includes the manifest and corresponding data for a
respective non-metadata portion;
normalize the output data stream;
generate a first hash code corresponding to the normal-
ized output data stream;
compare the first hash code to a plurality of hash codes,
each hash code of the plurality of hash codes corre-
sponding to one or more non-metadata portions of a
corresponding file of a plurality of files stored in a
database; and
when the first hash code matches any hash code of the
plurality of hash codes, perform at least one of the
following:
automatically remove the corresponding file associ-
ated with the matched hash code from the data-
base; or
display each of the first file and the corresponding
file associated with the matched hash code.
2. The system of claim 1, wherein the metadata portion
and the one or more non-metadata portions are classified
based on property promotion values included in the meta-
data portion.
3. The system of claim 1, wherein the metadata portion
and the one or more non-metadata portions are classified
based on property demotion values included in the metadata
portion.
4. The system of claim 1, wherein the metadata portion
and the one or more non-metadata portions are classified
based on an identifier included in the metadata portion.
5. The system of claim 1, wherein the output data stream
is normalized based on alphabetical order.
6. The system of claim 1, wherein the output data stream
is normalized based on reverse alphabetical order.
7. The system of claim 1, wherein the output data stream
has a format including a component name length, a com-
ponent name, a component length and component data, in
this order.
8. The system of claim 1, wherein each hash code is
generated using an XXH128 hash algorithm.
9. A method for deduplicating files, comprising:
receiving, by a processor, a first file represented by an
input data stream including one or more components;
classifying, by the processor, each component of the one
or more components into a metadata portion and one or
more non-metadata portions;
parsing, by the processor, the first file into the metadata
portion and the one or more non-metadata portions;
generating, by the processor, for each of the one or more
non-metadata portions, a manifest comprising:
a first entry representing a calculated component name
length;
a second entry representing a component name; and
a third entry representing a calculated component data
length;

22 generating, by the processor, an output data stream includ-
ing component manifest and data pairs for each of the
one or more non-metadata portions;
wherein each component manifest and data pairs each
includes the manifest and corresponding data for a
respective non-metadata portion;
normalizing, by the processor, the output data stream;
generating, by the processor, a first hash code correspond-
ing to the normalized output data stream;
comparing, by the processor, the first hash code to a
plurality of hash codes, each hash code of the plurality
of hash codes corresponding to one or more non-
metadata portions of a corresponding file of a plurality
of files stored in a database; and
when the first hash code matches any hash code of the
plurality of hash codes, perform at least one of the
following:
automatically remove the corresponding file associated
with the matched hash code from the database; or
display each of the first file and the corresponding
file associated with the matched hash code.
10. The method of claim 9, wherein the metadata portion
and the one or more non-metadata portions are classified
based on property promotion values included in the meta-
data portion.
11. The method of claim 9, wherein the metadata portion
and the one or more non-metadata portions are classified
based on property demotion values included in the metadata
portion.
12. The method of claim 9, wherein the metadata portion
and the one or more non-metadata portions are classified
based on an identifier included in the metadata portion.
13. The method of claim 9, wherein the output data stream
is normalized based on alphabetical order.
14. The method of claim 9, wherein the output data stream
is normalized based on reverse alphabetical order.
15. The method of claim 9, wherein the output data stream
has a format including a component name length, a com-
ponent name, a component length and component data, in
this order.
16. A non-transitory, computer-readable medium com-
prising a set of instructions stored therein which when
executed by a processor, causes the processor to:
receive a first file represented by an input data stream
including one or more components;
classify each component of the one or more components
into a metadata portion and one or more non-metadata
portions;
parse the first file into the metadata portion and the one or
more non-metadata portions;
generate for each of the one or more non-metadata por-
tions, a manifest comprising:
a first entry representing a calculated component name
length;
a second entry representing a component name; and
a third entry representing a calculated component data
length;
generate an output data stream including component
manifest and data pairs for each of the one or more
non-metadata portions;
wherein each component manifest and data pairs each
includes the manifest and corresponding data for a
respective non-metadata portion;
normalize the output data stream;
generate a first hash code corresponding to the normalized
output data stream;

compare the first hash code to a plurality of hash codes, each hash code of the plurality of hash codes corresponding to one or more non-metadata portions of a corresponding file of a plurality of files stored in a database; and when the first hash code matches any hash code of the plurality of hash codes, perform at least one of the following:

automatically remove the corresponding file associated with the matched hash code from the database; or display each of the first file and the corresponding file associated with the matched hash code.

17. The non-transitory, computer-readable medium of claim 16, wherein the metadata portion and the one or more non-metadata portions are classified based on property promotion values included in the metadata portion.

18. The non-transitory, computer-readable medium of claim 16, wherein the metadata portion and the one or more non-metadata portions are classified based on property demotion values included in the metadata portion.

19. The non-transitory, computer-readable medium of claim 16, wherein the output data stream is normalized based on alphabetical order.

20. The non-transitory, computer-readable medium of claim 16, wherein the output data stream is normalized based on reverse alphabetical order.

\* \* \* \* \*